CRACKING OF LIGHT EAST TEXAS GAS OIL OVER DEALUMINIZED H+MORDENITE

United States Patent Office 3,551,353
Patented Dec. 29, 1970

3,551,353
DEALUMINIZATION OF MORDENITE
Nai Yuen Chen and Fritz A. Smith, Cherry Hill, N.J., assignors to Mobil Oil Corporation, a corporation of New York
Filed Oct. 4, 1968, Ser. No. 765,031
Int. Cl. C10g 35/08
U.S. Cl. 252—455
6 Claims

ABSTRACT OF THE DISCLOSURE

A method for increasing the silica/alumina mol ratio of crystalline aluminosilicates having a silica/alumina mol ratio greater than 10, e.g., mordenite, by a process comprising alternate steam and acid treatment of the same, the resulting catalyst composition produced thereby, and hydrocarbon conversion therewith.

BACKGROUND OF THE INVENTION

(1) Field of the invention

Figure 1:
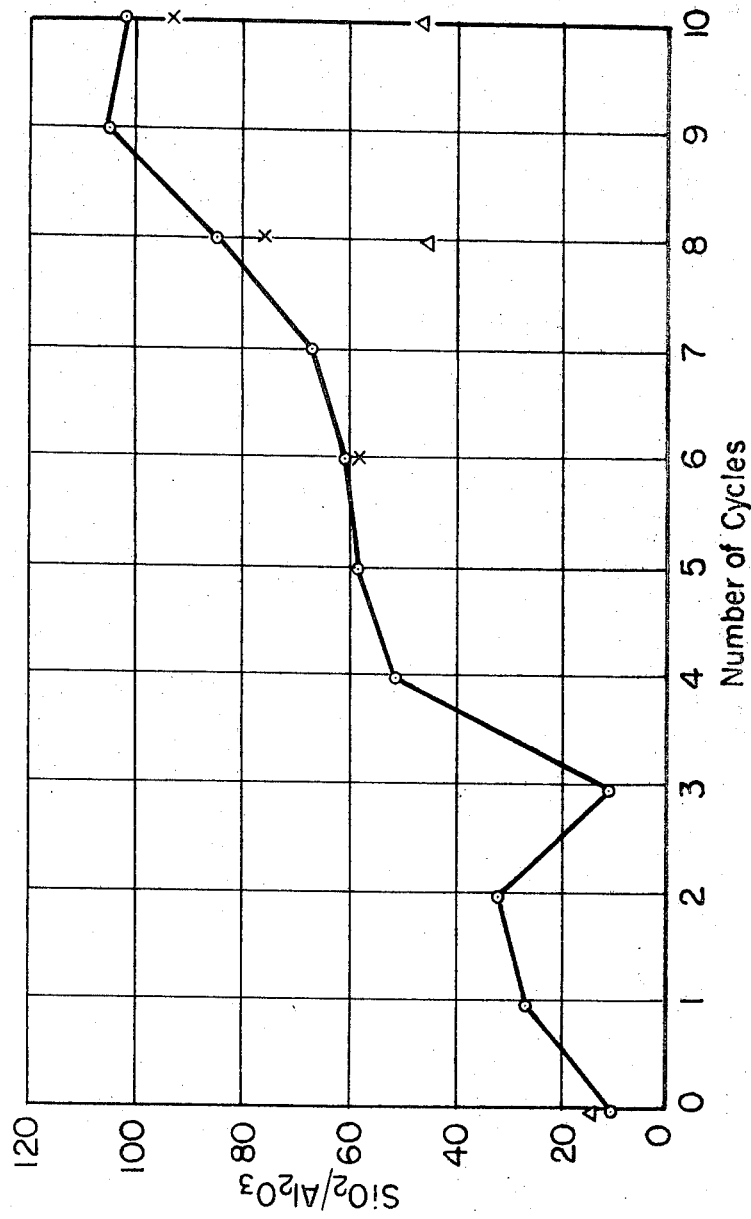

This invention relates to a method for increasing the silica/alumina mol ratio of high silica/alumina mol ratio crystalline aluminosilicates, the catalysts produced thereby, and hydrocarbon conversion therewith.

(2) Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as $$\frac{Ca}{2}, \frac{Sr}{2}$$

Na, K or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite Y (U.S. 3,130,007), zeolite K–G (U.S. 3,055,654), zeolite ZK–5 (U.S. 3,247,195), and zeolite ZK–4 (U.S. 3,314,752), merely to name a few.

One such zeolite material, obtained both naturally and synthetically, by the prior art, has been mordenite. In its natural state it usually appears as the sodium salt which is represented by the following formula:

$$Na_8(AlO_2)_8(SiO_2)_{40} 24H_2O$$

Mordenite's ordered crystalline structure is believed to be made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameters. As a result of this crystalline framework, mordenite can absorb simple cyclic hydrocarbons, such as cyclopentane, cyclohexane, benzene and the like, simple branched-chain hydrocarbons, such as 2-methylpentane, as well as straight chain hydrocarbons.

The hydrogen form mordenite employed in the subject process is prepared by conventional techniques which include the exchange of mordenite with acid solution, or more commonly and preferably, conversion of mordenite to the ammonium form via base exchange with an ammonium salt and calcination of the resultant ammonium-form ordenite to cause thermal degradation of the ammonium ions and formation of the desired hydrogen cationic sites.

Up to the present time, the prior art has generally been able to produce mordenite having silica/alumina mol ratios of 10 to 20. While silica/alumina mol ratios as high as about 30 have been obtained by acid leaching of the alumina from the structure, still, no method has been found which will give silica/alumina mol ratios higher than that.

For example, hydrogen mordenite, when used as a cracking catalyst, converts a disproportionate amount of the gas oil charge into undesirable secondary cracked products such as dry gases and coke. It was postulated that product selectivities could be improved if a better balance between catalytic activity and diffusional properties of the catalyst could be attained. Removing aluminum, and thereby also the H+ ion from the zeolite structure, provided one of the potential ways of achieving such balance. However, the problem then was how to remove substantial amounts of alumina from the mordenite structure, without causing the collapse of the crystal structure.

SUMMARY OF THE INVENTION

It is therefore, among one of the principal objectives of the invention to provide a method for increasing the silica/alumina mol ratio of crystalline aluminosilicates having a silica/alumina mol ratio greater than 10, particularly mordenite, to values heretofore unknown, while maintaining its crystalline structure.

In accordance with the present invention, there is now provided a method for increasing the silica/alumina mol ratio of crystalline aluminosilicates such as mordenite by a process involving alternate multiple cycles of steaming and acid extraction.

According to the process of the invention, mordenite compositions have been obtained characterized by very high silica/alumina ratios ranging from 35 up to 100 or more. These have been found to be quite active catalyst compositions for various hydrocarbon conversion reactions.

DESCRIPTION OF SPECIFIC EMBODIMENTS

The high silica/alumina mordenite compositions of the present invention are prepared by contacting a conventional mordenite starting material with steam and a mineral acid in multiple alternate cycles of steaming and refluxing in acid.

By this method, it has been found possible to attain high silica/alumina mol ratios for mordenite, ranging up to 100 or more. Ratios in this range have been previously unknown to the prior art. Indeed, by conventional acid leaching of alumina from the mordenite structure, it has heretofore been possible to obtain silica/alumina mol ratios of only up to about 30.

While it is intended as within the scope of the invention to employ any mineral acid, e.g., HCl, $H_2SO_4$, $H_3PO_4$, and the like, it is particularly preferred to employ hydrochloric acid. Alternatively, an organic acid such as acetic acid may be used. The concentration of the acid used in the extraction step is between about 0.2 and 10 N, and preferably between about 0.5 and 2 N.

Steaming conditions are above about 600° F. and preferably above about 1000° F. at 1 atm. $H_2O$ pressure. The amount of water present is not critical so long as there is some water present for hydrolysis to take place.

A particularly effective procedure has been found to be one consisting of multiple cycles of steaming for two hours at 1000° F., followed by boiling in 2 N HCl for two hours.

The extent of aluminum removal resulting from identical steaming-acid extraction cycles appears to depend on the starting hydrogen-mordenite material to some extent. For example, using one H-Zeolite (commercially available H-Mordenite) sample, ten cycles resulted in a silica/alumina ratio of 93 to 1; however, another lot, with the same number of cycles resulted in a silica/alumina ratio of 47 to 1. Thus, while some structural differences among synthetic mordenite samples are suggested, the method of the invention is still effective in accomplishing its intended result.

While the number of steaming-acid extraction cycles may be carried out for an indefinite number, this will not be necessary once the maximum silica/alumina mol ratio is obtained.

Crystallinity of mordenite, as indicated by routine X-ray powder diffraction analyses, is not decreased by dealuminization. Most dealuminized samples, including those with 90% aluminum removal, have crystallinity of 80–95 compared to the starting material, which has a crystallinity of 90 (arbitrary scale).

The dealuminized mordenite compositions of the invention are highly active to hydrocarbon conversion reactions such as cracking, and they may be composited with a suitable metallic component, such as a platinum group metal, for catalyzing such reactions as hydrocracking, hydroisomerization, and the like.

The invention will be further defined in conjunction with the following illustrative examples.

EXAMPLE 1

Multi-state high temperature hydrolysis and acid extraction (A) Attainment of high silica/alumina mordenite ($SiO_2/Al_2O_3 > 100$).—Hydrogen mordenite (Sample No. 1) was put through cycles of steaming at 1000° F. for two hours, followed by refluxing in 2 N HCl (~46 meq. H+/gm.) for four hours. After nine such cycles, the silica to alumina mol ratio was greater than 100:1. The weight percent alumina was reduced from 13.4% to 1.6% corresponding to 89% removal of the alumina in the starting material. However, during the first three cycles, the silica-to-alumina ratio rose first to 32 and then fell to 11, indicating simultaneous loss of both alumina and silica. The change of $SiO_2/Al_2O_3$ as a function of the number of steam and acid cycles is shown in FIG. 1.

(B) Reproducibility.—The same method was repeated on both samples of the same lot (Sample No. 1) and of a different lot (Sample No. 2). Results are also shown in FIG. 1. Reproducibility on the same lot was fairly well established, but results on different lots indicate structural differences between synthetic mordenite samples. The $SiO_2/Al_2O_3$ ratio of Sample No. 2 was no higher than 47 (corresponding to 69% Al removal) after 10 cycles.

EXAMPLE 2

Physical properties of dealuminized mordenite (A) Crystal Structure.—Earlier study on dealuminization on zeolite Y, zeolite T and erionite showed that, as the percentage of aluminum removal exceeded the 30–40% level, X-ray diffraction analyses showed progressively decreasing crystallinity.

Figure 2:
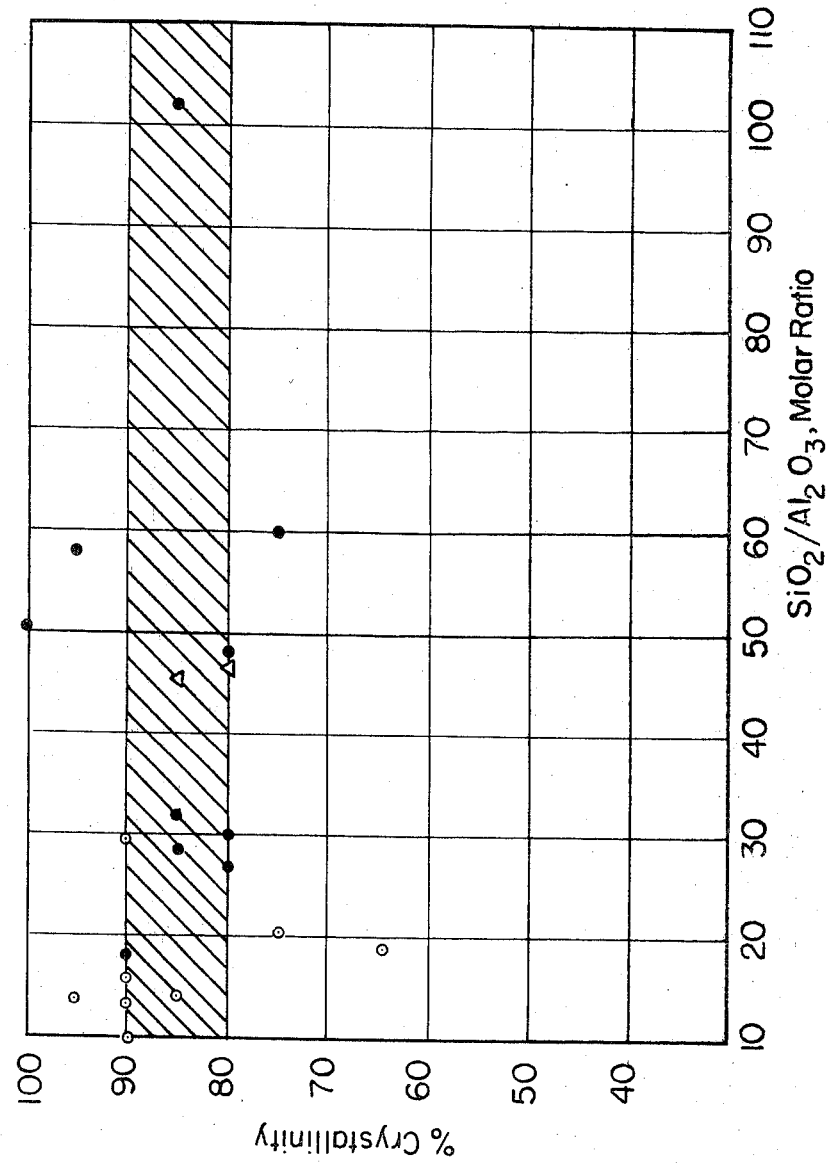

Results on ethylenediamine tetracetic acid extraction of zeolite T provided additional evidence that the aluminum extraction proceeded in a shell-progression manner, creating a highly siliceous but amorphous outer layer, with an inner core substantially unaltered. With mordenite, there is no strong evidence for this type of uneven aluminum extraction leading to the formation of an amorphous outer layer. In fact, after simultaneous loss of silica and alumina caused by the cyclic steam-acid treatments, microscopic examination of the dealuminized sample showed no reduction in crystal size. In addition, X-ray diffraction data on dealuminized mordenite, as summarized in FIG. 2, show that the crystallinity is generally between 80 and 90% with a few exceptions that went as low as 65% (after reflux in 10 N HCl). These data suggest that the aluminum is uniformly removed from the structure and prove the robustness of the mordenite structure toward aluminum removal.

Figure 3:
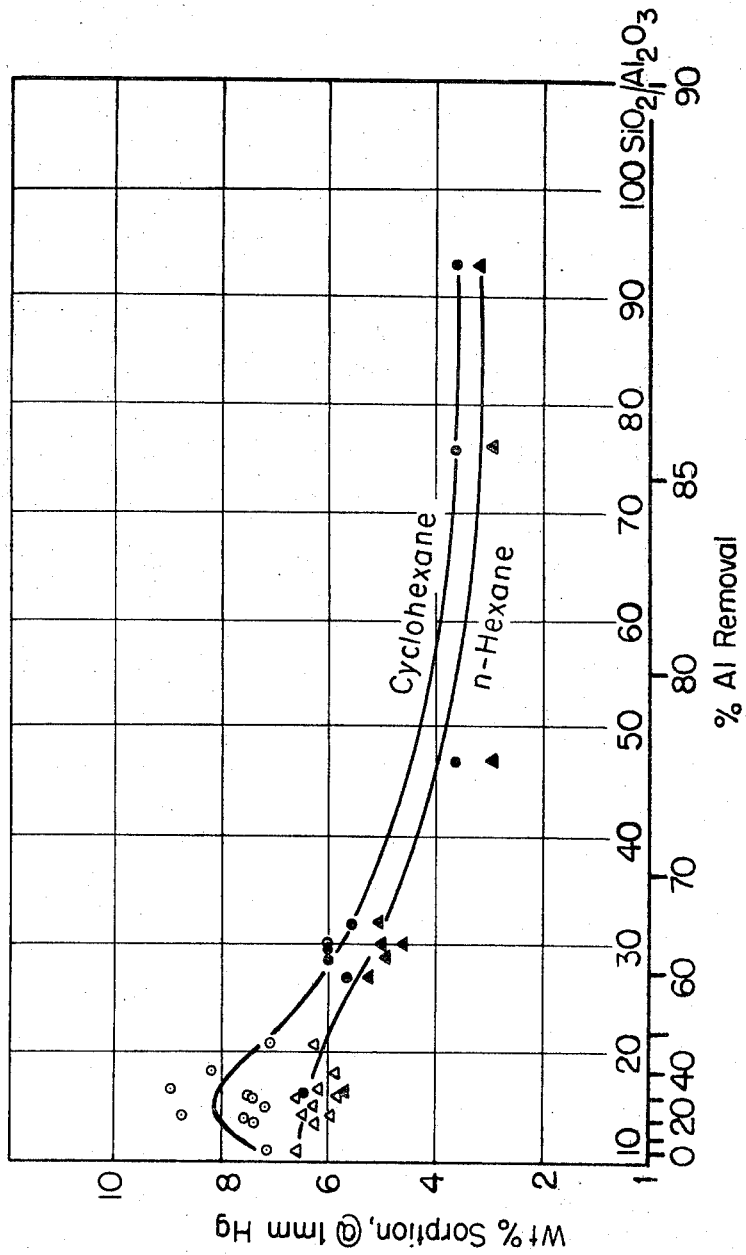
Figure 4:
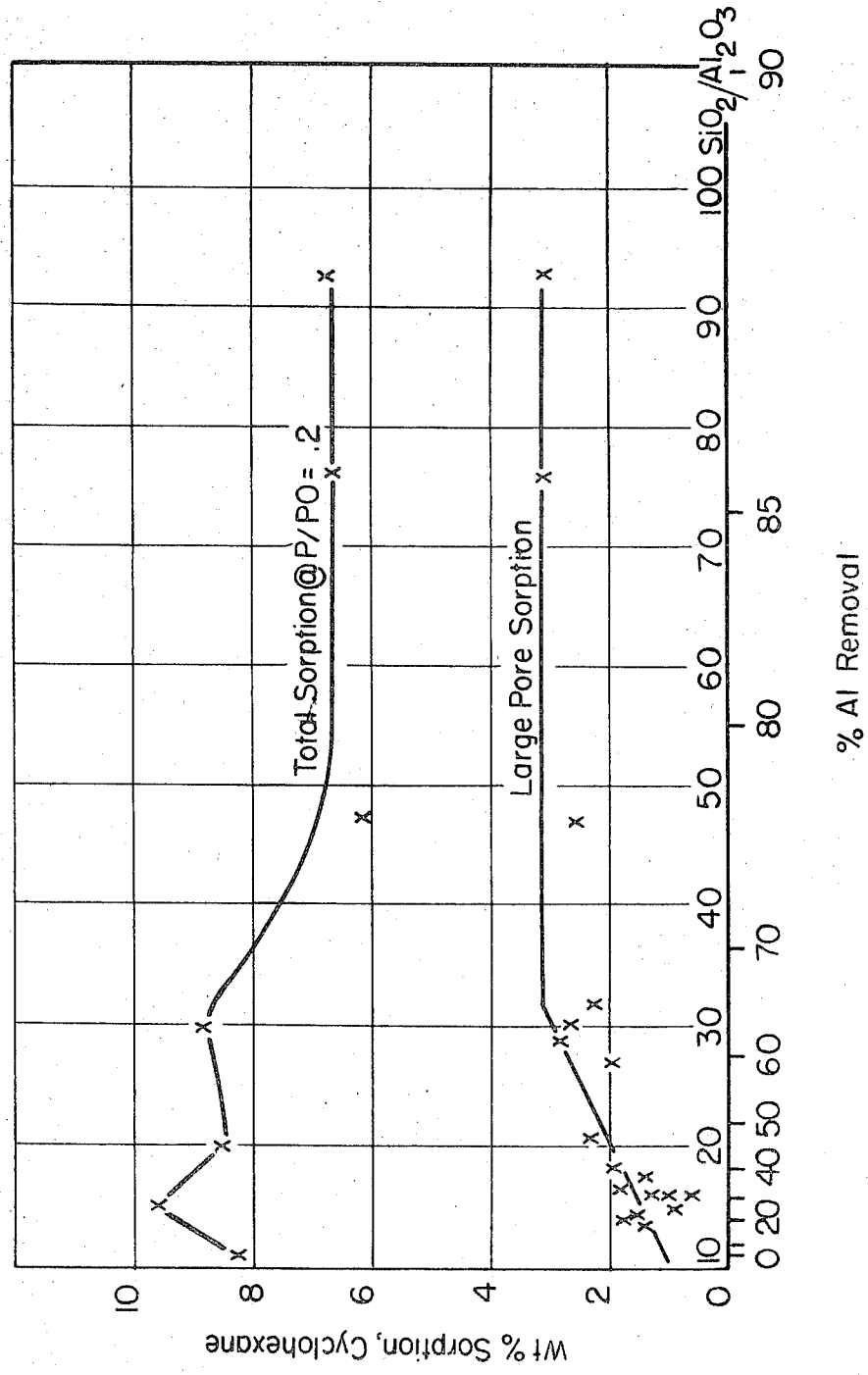

(B) Hydrocarbon Sorption.—Equilibrium sorption data of dealuminized mordenite samples are shown in FIG. 3 at $p/p°$ [1] $\sim 0.01$ for cyclohexane and hexane, and in FIG. 4 at $p/p° \sim 0.2$ for cyclohexane. We note that the total capacity at $p/p° \sim 0.2$ (FIG. 4) shows a maximum gain of about 18% at about 30% aluminum removal and a loss of 18% at about 90% alumina removal. The sorption data at $p/p° = 0.01$ (FIG. 3) shows a larger drop in capacity. This decrease is coupled with an increase in "large pore" sorption capacity from 1% to 3.1% (FIG. 4, lower curve), as measured by the difference between sorption capacity at $p/p°$ of 0.2 (FIG. 4, upper curve) and that at $p/p°$ of 0.01 (FIG. 3, upper curve). This increase in "large pore" sorption capacity occurs simultaneously with the observed shift in X-ray diffraction pattern beyond 30% alumina removal which has been generally interpreted in terms of changes in the dimension of the unit cell. We interpret this as the enlargement of the openings in the zeolite without destroying its basic structure. These data corroborate X-ray findings and prove the robustness of the mordenite structure toward alumina removal.

EXAMPLE 3

Catalytic properties of dealuminized mordenite (A) Acid catalysis.—1.—Gas oil cracking—(a) Background.—Untreated hydrogen mordenite has been known as a poor gasoline producer in cracking gas oils. It has appeared plausible that, by dealuminizing mordenite and thereby reducing its protonic acid site density, it would be possible to reduce its catalytic activity to a level suitable for gasoline production. The basic idea is similar to the prior art practice in deactivating highly active rare earth or ammonium faujasite catalysts by steaming and/or high temperature treatments. In the case of modenites, steam alone poduced catalysts of essentially no sorption capacity, and after acid extraction, the catalysts remained highly active as indicated by their α-values.

Two approaches were considered in trying to develop a mordenite catalyst which would be selective for cracking. In each instance the goal was to obtain a better bal-

---

[1] $p/p°$: Where $p°$ is the vapor pressure of the sorbate at the temperature of the sorption experiment, and $p$ is the actual pressure of sorbate used in the sorption experiment, e.g. cyclohexane has a vapor pressure of 98 mm. Hg at 25° C. (77° F.), the pressure of cyclohexane vapor used in the experiment is 20 mm. Hg. Thus, the $p/p°$ would be 20/98~0.2.

ance between diffusion rates and kinetic rates, that is, decrease the kinetic rate without changing the diffusion rate significantly. The first approach was to back exchange with sodium salts to decrease some of the acid sites, thus decreasing the kinetic rate. This was done with a mordenite sample which had a silica to alumina ratio of 21. The conversions, sodium content and adsorption results are shown below:

SODIUM CONTENT AFTER BACK EXCHANGE, WT. PERCENT

|  | 0.08 (no exchange) | 1.56 | 3.38 |
| --- | --- | --- | --- |
| Cracking conditions and results: [1] |  |  |  |
| Temperature, °F | 900 | 900 | 900 |
| WHSV | 2.4 | 2.4 | 2.4 |
| Cat./oil ratio, wt./wt | 3.1 | 3.1 | 3.1 |
| Conversion, wt. percent | 32 | 49 |  |
| Coke, wt. percent | 5.3 | 1.4 |  |
| Adsorption results: |  |  |  |
| $H_2O$, wt. percent | 10.9 | 10.7 | 10.6 |
| Cyclohexane, wt. percent | 8.3 | 6.9 | 2.2 |
| Normal hexane, wt. percent | 6.3 | 5.3 | 1.4 |

[1] Charge stock: Light East Texas Gas Oil.

This data demonstrates that an improvement in kinetic rate to diffusional rates can be attained by replacing acid sites with inactive sodium sites. However, too much sodium can be added which decreases diffusional rates, thus making the situation worse. The adsorption results demonstrate this, as sodium content goes up hydrocarbon adsorption goes down. The much smaller $H_2O$ molecule, however, still adsorbs to about the same capacity.

Since the diffusional problem obviously gets worse with back exchange, a sample of mordenite of column one above was alternately steamed and acid extracted to a silica to alumina ratio of 44 to 1. This catalyst resulted in a conversion of 42 weight percent with a coke make of only 0.9 weight percent. This showed that dealuminization would significantly improve conversion, but without the blocking effect of sodium ions.

Figure 5:
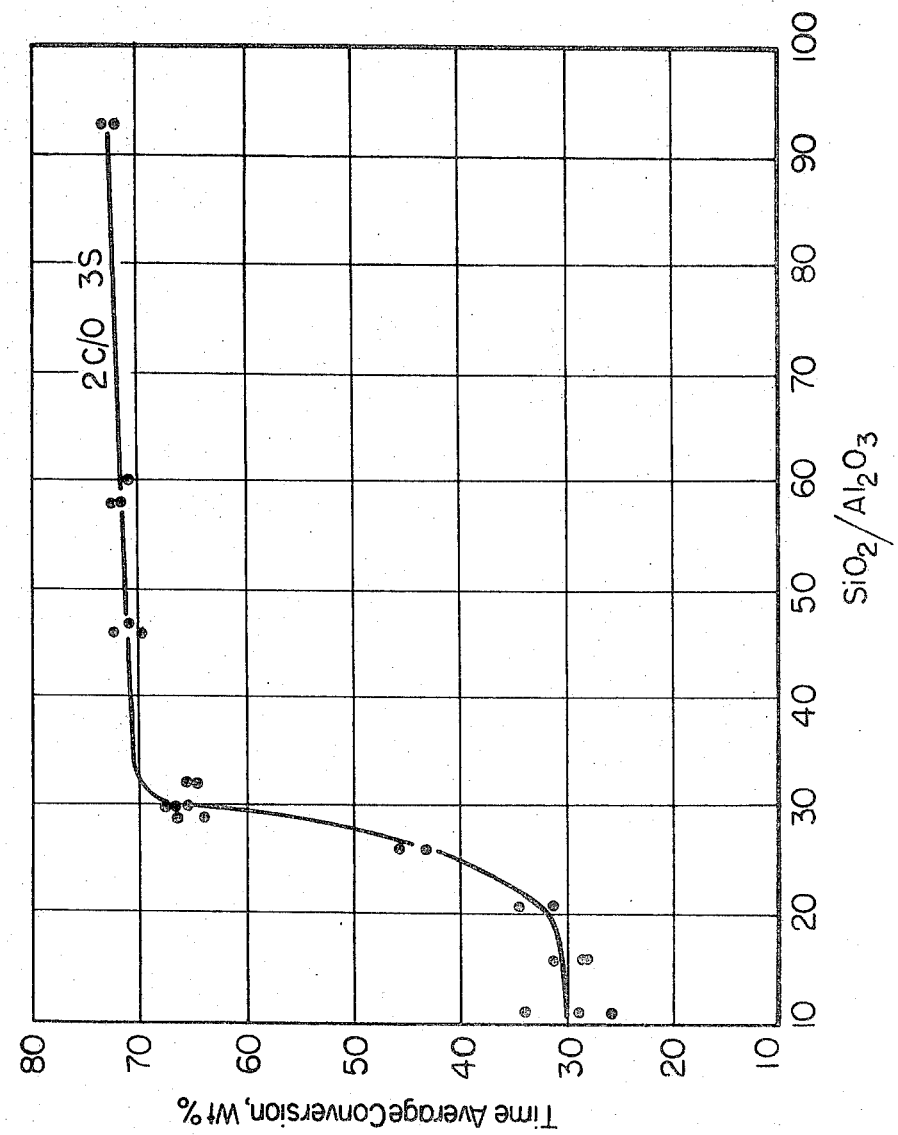

(b) Conversion—In view of the high ratings, it was expected that gas oil cracking under standard fixed bed test conditions (900° F., 2 C/O, 3 SV) would result in low conversion due to excessive secondary cracking and fast catalyst aging. In fact, it was found that in a fixed bad micro gas oil cracking unit that untreated hydrogen mordenite gave very low cumulative conversion over a duration of ten minutes. Conversion did not increase appreciably up to 20/1 $SiO_2/Al_2O_3$ (45% Al removal). However, thereafter this time-average-conversion value rose sharply with increasing dealuminization until over 70% conversion was achieved when $SiO_2/Al_2O_3$ rose beyond 30 (60% aluminum removal). The experimental data are shown in FIG. 5. The results were suprising in view of the fact that catalytic activity remained after nearly 90% of the aluminum had been removed from the catalyst.

(B) Dual functional catalysis.—1. Description of catalyst.—Ion exchanged dealuminized mordenite, (made from Sample No. 2) having a $SiO_2/Al_2O_3=32$ mol ratio, was treated with a 0.2 N NaCl solution containing a trace amount of Pt $(NH_3)_4Cl_2$ to yield a final catalyst containing 0.15 weight percent Pt. The catalyst contained 1.8% Na (~80% cationic sites), sorbed 6.5 weight percent cyclohexane and had an alpha rating of 300–900.

2.—Hydrocracking of n-Paraffins.—(a) Mixture of n-Paraffins.—A blend consisting of 20% n-$C_8$, 50% n-$C_{10}$, 15% n-$C_{12}$ and 15% n-$C_{16}$ was charged over the catalyst. The liquid products from runs made with this blend were trapped under liquid nitrogen and then analyzed by chromatography. Well over 90% of the material charged was recovered, but the gas streams were not analyzed; consequently, the results are qualitative. Liquid analyses are shown in Table 2 for runs made at 300 p.s.i.g. and 1.5 LHSV.

TABLE 2.—HYDROCRACKING A BLEND OF n-PARAFFINS

| Temperature, °F. | Charge stock | 500 | 525 |
| --- | --- | --- | --- |
| Composition, wt. percent: |  |  |  |
| Dry gas |  | 0.1 | 0.2 |
| Butanes |  | 0.2 | 0.5 |
| $C_5$ to $C_7$ |  | 0.9 | 5.3 |
| Octanes | 20 | 22.9 | 24.9 |
| Decanes | 50 | 55.0 | 57.1 |
| Dodecanes | 15 | 14.6 | 11.6 |
| Hexadecanes | 15 | 6.3 | 0.4 |
| Total | 100 | 100.0 | 100.0 |

It is interesting to note the shift in carbon number was such that only $C_{16}$ molecules have decreased significantly, and there was a net increase in $C_8$–$C_{10}$ molecules. Chromatograms also indicated that a significant amount of isomeric molecules were present throughout the range of carbon numbers.

More detailed information on the degree of isomerization was obtained on a similar run made with n-hexadecane at 500° F., 300 p.s.i.g. and 1.3 LHSV. These data are shown in Table 3.

TABLE 3.—ISOMERIZATION IN HEXADECANE CRACKING
[Conversion ($C_{16}$?)~60%]

|  | $C_4$ | $C_5$ | $C_6$ | $C_{16}$ |
| --- | --- | --- | --- | --- |
| Percent branched | 65 | 80 | 85 | 54 |

3.—Hydroisomerization.—(a)—n - Hexane—At 600–650° F. and 300 p.s.i.g. n-hexane was hydroisomerized to give the following yields:

TABLE 4.—HYDROISOMERIZATION OF n-HEXANE OVER Pt-DEALUMINIZED MORDENITE

| Temperature, °F | 600 | 650 |
| --- | --- | --- |
| LHSV | 1.2 | 2.4 |
| $H_2$/charge, mol/mol | 35 | 26 |
| Yield, wt. percent: |  |  |
| $C_6$ | 5 | 7 |
| iso $C_6$'s | 51 | 62 |
| $nC_6$ | 45 | 31 |
| Conversion [1] | 68 | 83 |
| Selectivity [2] | 93 | 92 |

[1] Conversion=100 minus n-hexane above equilibrium amount.
[2] Selectivity=1−$C_5$/conversion.

TABLE 5.—COMPOSITION OF $C_6$ ISOMERS

| Temperature, °F. | 600 | | 650 | |
| --- | --- | --- | --- | --- |
|  | Actual | Theoretical | Actual | Theoretical |
| n-Hexane | [1] 19 | 19 | [1] 20 | 20 |
| 2-Methylpentane + 2,3 dimethylbutane | 48 | 41 | 44 | 41 |
| 3 Methylpentane | 27 | 22 | 26 | 23 |
| 2,2 dimethylbutane | 6 | 18 | 10 | + 16 |

[1] n-Hexane assumed at equilibrium.

Comparison of the composition of the $C_6$ isomers with that of the equilibrium mixture (Table 5) shows that 2,2 dimethylbutane yield is significantly lower than predicted, particularly at 600° F.

What is claimed is:

1. A method for increasing the silica to alumina mol ratio of mordenite by contacting a mordenite starting material with steam and a mineral acid, said contacting comprising alternate multiple cycles of steaming and refluxing in said acid.

2. A method according to claim 1 wherein said mineral acid comprises hydrochloric acid having a concentration between about 0.2 and 10 normal.

3. A method according to claim 2 wherein the steaming conditions consist of a temperature above about 600° F. at 1 atmosphere water pressure.

4. A method according to claim 3 wherein said steaming is conducted at a temperature of about 1000° F. for a period of about two hours, said acid having a concentration of about 2 normal, said refluxing being conducted for a period of about two hours.

5. A method according to claim 4 wherein the multiple cycles are 9 in number.

6. A method for increasing the silica to alumina mol ratio of a crystalline aluminosilicate having an initial silica/alumina mol ratio greater than 10 by contacting the same with steam and an acid, said contacting comprising alternate multiple cycles of steaming and refluxing in acid.

References Cited

UNITED STATES PATENTS

| 3,442,795 | 5/1969 | Kerr et al. | 208—120 |
| 3,480,539 | 11/1969 | Voorhies et al. | 208—111 |
| 3,224,167 | 12/1965 | Jones | 252—455 |
| 3,442,794 | 5/1969 | Henricus et al. | 252—455 |

DELBERT E. GANTZ, Primary Examiner

A. RIMENS, Assistant Examiner

U.S. Cl. X.R.

208—111, 120

PO-1050
(5/69)

UNITED STATES PATENT OFFICE
CERTIFICATE OF CORRECTION

Patent No. 3,551,353             Dated  December 29, 1970

Inventor(s) NAI YUEN CHEN and FRITZ A. SMITH

It is certified that error appears in the above-identified patent and that said Letters Patent are hereby corrected as shown below:

Col. 2, line 24 - "ordenite" should be --mordenite--

Col. 6, line 26 (Table 3) - "[Conversion ($C_{16}^2$)" should be --[Conversion ($C_{16}^-$)--

Signed and sealed this 13th day of July 1971.

(SEAL)
Attest:

EDWARD M. FLETCHER, JR.
Attesting Officer

WILLIAM E. SCHUYLER, JR.
Commissioner of Patents